(12) United States Patent
Schroeder et al.

(10) Patent No.: US 11,056,252 B2
(45) Date of Patent: Jul. 6, 2021

(54) ELECTRICAL SIGNAL TRANSMISSION CABLE SYSTEM AND METHOD OF USING SAME

(71) Applicants: Douglas W Schroeder, Greendale, WI (US); Daniel W Celander, Evanston, IL (US)

(72) Inventors: Douglas W Schroeder, Greendale, WI (US); Daniel W Celander, Evanston, IL (US)

( * ) Notice: Subject to any disclaimer, the term of this patent is extended or adjusted under 35 U.S.C. 154(b) by 51 days.

(21) Appl. No.: 16/517,199

(22) Filed: Jul. 19, 2019

(65) Prior Publication Data

US 2020/0161022 A1    May 21, 2020

Related U.S. Application Data

(60) Provisional application No. 62/843,238, filed on May 3, 2019, provisional application No. 62/700,806, filed on Jul. 19, 2018.

(51) Int. Cl.
| | |
|---|---|
| *H01B 11/02* | (2006.01) |
| *H01B 11/00* | (2006.01) |
| *H01B 11/04* | (2006.01) |
| *H04N 21/4363* | (2011.01) |

(52) U.S. Cl.
CPC .......... *H01B 11/002* (2013.01); *H01B 11/04* (2013.01); *H04N 21/43635* (2013.01)

(58) Field of Classification Search
CPC . H01B 7/108; H01B 7/17; H01B 7/30; H01B 11/002; H01B 11/04; H01B 11/06; H01B 11/08; H01B 11/12; H02G 3/04; H02G 3/06; H02G 3/08; H02G 15/04; H02G 15/06; H01R 7/02; H01R 9/03; H01R 9/22; H01R 11/01; H01R 11/09; H01R 11/11; H01R 11/12; H01R 13/46; H01R 13/50; H01R 13/52
USPC ..... 174/110 R, 113 R, 74 R, 77 R, 78, 84 R, 174/87, 88 R
See application file for complete search history.

(56) References Cited

U.S. PATENT DOCUMENTS

| | | | | |
|---|---|---|---|---|
| 5,790,896 | A * | 8/1998 | Nguyen | H01R 31/005 439/169 |
| 6,530,085 | B1 * | 3/2003 | Perlman | H04N 21/42219 725/82 |
| 6,545,213 | B1 * | 4/2003 | Gabriel | H01B 11/14 174/113 R |
| 6,791,025 | B2 * | 9/2004 | Devine | H01B 17/60 174/118 |
| 6,800,810 | B1 * | 10/2004 | Page | H01B 11/20 174/102 R |

(Continued)

FOREIGN PATENT DOCUMENTS

| | | | | |
|---|---|---|---|---|
| GB | 2252197 | A * | 7/1992 | H01B 7/08 |
| GB | 2508154 | A * | 5/2014 | H01R 13/7193 |
| KR | 20040064089 | A * | 7/2004 | H01B 11/10 |

*Primary Examiner* — William H. Mayo, III
(74) *Attorney, Agent, or Firm* — Daniel W. Celander

(57) ABSTRACT

Electrical signal transmission cable systems and methods of using the same are disclosed. The systems and methods use an electrical signal transmission cable system, wherein the electrical signal transmission cable system includes a parallel set of electrical signal transmission cables in electrical communication between an electrical signal transmitting device and an electrical signal receiving device.

20 Claims, 8 Drawing Sheets

(56) References Cited

U.S. PATENT DOCUMENTS

| | | | | |
|---|---|---|---|---|
| 7,242,780 B2* | 7/2007 | Brisson | ............... | H04B 3/144 |
| | | | | 330/149 |
| 7,446,258 B1* | 11/2008 | Sosna | ............... | H01B 11/125 |
| | | | | 174/33 |
| 7,488,187 B2* | 2/2009 | Wolf | ............... | H01R 31/005 |
| | | | | 439/106 |
| 7,521,634 B2* | 4/2009 | Clem | ............... | G01R 1/06788 |
| | | | | 174/113 R |
| 7,871,293 B1* | 1/2011 | Chung | ............... | H01B 11/12 |
| | | | | 439/502 |
| 8,362,358 B2* | 1/2013 | Hotte | ............... | H01B 7/0027 |
| | | | | 174/9 F |
| 8,525,029 B2* | 9/2013 | Kato | ............... | C07C 227/04 |
| | | | | 174/113 R |
| 8,895,855 B2* | 11/2014 | Heo | ............... | H01R 11/11 |
| | | | | 174/72 R |
| 8,916,774 B2* | 12/2014 | Richards | ............... | H02G 3/0487 |
| | | | | 174/70 C |
| 2003/0103171 A1* | 6/2003 | Hall, Jr. | ............... | G03B 21/006 |
| | | | | 349/5 |
| 2004/0206528 A1* | 10/2004 | Wu | ............... | H01R 31/06 |
| | | | | 174/36 |
| 2006/0234546 A1* | 10/2006 | Mori | ............... | H04N 9/68 |
| | | | | 439/540.1 |
| 2007/0233906 A1* | 10/2007 | Tatum | ............... | G09G 5/003 |
| | | | | 710/26 |
| 2008/0045073 A1* | 2/2008 | Kuo | ............... | H01R 13/5845 |
| | | | | 439/449 |
| 2010/0236814 A1* | 9/2010 | Wang | ............... | H01B 11/00 |
| | | | | 174/115 |
| 2012/0012387 A1* | 1/2012 | Horan | ............... | H04L 25/03878 |
| | | | | 174/74 R |

* cited by examiner

ELECTRICAL SIGNAL TRANSMISSION CABLE SYSTEM AND METHOD OF USING SAME

CROSS-REFERENCE TO RELATED APPLICATIONS

This application claims benefit of priority under 35 U.S.C. 119 to U.S. Provisional Patent Application Ser. No. 62/700,806, filed Jul. 19, 2018 and U.S. Provisional Patent Application Ser. No. 62/843,238, filed May 3, 2019, both entitled "ELECTRICAL SIGNAL TRANSMISSION CABLE SYSTEM AND METHOD OF USING SAME," the contents of which are herein incorporated by reference in their entirety.

FIELD OF THE INVENTION

This invention relates to the field of electrical signal transmission cable systems and methods of use and in particular to electrical signal transmission cable systems that reduce signal transmission artifacts of a signal transmitted through it between two electronic components.

BACKGROUND OF THE INVENTION

In modern high-end audio and home theater systems audio cables—interconnect cables used to connect various components such as a CD player, preamplifier and an amplifier—are playing a major role, substantially affecting the listening experience of audiophiles and, therefore, the overall performance of the high-end system. As a result, the manufacture of high-end audio cables has developed into a multi-million dollar per year industry.

Using state of the art electrical engineering knowledge of transmission-line characteristics and, in particular, inductance, resistance, and capacitance (LRC) values of cables, it is impossible to explain that an experienced listener is able to perceive differences in the listening experience when listening to a same high-end audio system but using different audio cables for connecting the various components.

However, it is known that an experienced listener is able to perceive very subtle artifacts of an audio signal transmitted through electrical signal conductors, including phase coherence distortion, harmonic distortion, passive intermodulation distortion, electrical noise and other interference caused by electromagnetic and radio frequency radiation unrelated to the audio signal, and impedance and capacitance imbalances within the cable for an electrical audio signal transmitted through the cable. Such artifacts are typically manifest when the experienced user perceives changes in the harmonic integrity of the musical reproduction, the attendant noise level, pace of the musical reproduction, the overall dimensionality of the acoustic envelope presented in the musical reproduction, among other qualities, when one cable is replaced by another cable introduced into the system.

Numerous attempts have been made to minimize artifacts introduced into an electrical signal when the electrical signal is transmitted through an electrical signal transmission cable. One type of artifact, that of noise picked up by the electrical signal transmission cable itself, has been the focus of cable manufacturers and experienced listeners alike using different types of cable interconnections having either an unbalanced configuration or a balanced configuration.

An unbalanced cable consists of two connectors terminated at each end of the cable assembly and two conductors within the cable assembly. The conductors inside the cable include a signal conductor and a ground conductor, which are typically composed of solid wire or some other conductive material. In a typical unbalanced cable configuration, only the signal conductor serves as the conductor for an electrical signal transmission. Inside the unbalanced cable, the signal wire is typically in the center of the cable with the ground wire surrounding it. The ground wire serves two functions. It carries part of the audio signal and serves to shield the main signal wire to some degree from outside interference from noise such as the hum from lights and transformers, as well as radio frequency interference that comes from cable, TV and radio transmissions. The unbalanced cable does reject noise to some extent, but unfortunately, the signal conductor itself also acts like an antenna and picks up noise. The ground conductor surrounding the signal conductor does not serve as a functional conductor for an electrical signal transmission, to the extent that such is used to transmit an electrical signal from an output of one electrical signal transmitter to the input of another electrical signal receiver. As a result, unbalanced cables can introduce and transmit electrical signal artifacts like noise during electrical signal transmission through the cable (FIG. 1).

A balanced cable consists of two connectors terminated at each end of the cable assembly and three conductors within the cable assembly. Two conductors inside a balanced cable are used as signal conductors, whereas the third conductor serves as a ground conductor that surrounds the two signal conductors. All three conductors are typically composed of solid wire or some other conductive material. In a typical balanced cable configuration, the two signal conductors are used for carrying an electrical signal having opposite signal polarity. That is, signal conductors each carry a copy of the signal, but the two copies are transmitted through the cable with their relative signal polarities reversed. Both signal conductors are susceptible to picking up noise like the single signal conductor of the unbalanced cable, with each signal conductor picking up the same type and level of noise. However, one copy of the signal propagated in one signal conductor is inverted at the receiving connector and recombined with the copy of the signal of the opposite polarity prior to electrical signal transmission to the receiving device. The net result of summing the signals from the two signal conductors is preservation of the electrical signal being transmitted through the balanced cable with the attendant noise being canceled (FIG. 2).

Common unbalanced cables are usually terminated on both ends by an RCA connector. The RCA connector is in electrical communication with the conductors in the cable and the output of the electrical signal transmitting device and the input of the electrical signal receiving device. Common balanced cables are usually terminated at both ends with an XLR connector. The XLR connector is in electrical communication with the conductors in the cable and the output of the electrical signal transmitting device and the input of the electrical signal receiving device.

Notwithstanding the success of cables of unbalanced and balanced configurations, it would be desirable to provide an electrical signal transmission cable system and a method that reduces artifacts present for electrical signals transmitted through the aforementioned conventional interconnects.

SUMMARY OF THE INVENTION

In a first aspect, a method of reducing an artifact in an electrical signal transmission through an electrical signal transmission cable is provided. The method includes several steps. The first step includes providing an electrical signal transmitting device. The second step includes providing an electrical signal receiving device. The third step includes providing an electrical signal transmission cable system. The electrical signal transmission cable system includes a parallel set of electrical signal transmission cables in electrical communication between the electrical signal transmitting device and the electrical signal receiving device. The fourth step includes transmitting an electrical signal through the electrical signal transmission cable system from the electrical signal transmitting device to the electrical signal receiving device. The result of practicing the method is that at least one artifact is reduced in the electrical signal transmission delivered to the electrical signal receiving device.

In a second aspect, a product comprising an integrated electrical signal transmission cable system is provided. The product includes the following components: (a) an enclosure; (b) a first electrical signal splitter; (c) a second electrical signal splitter; and (d) a discrete set of parallel electrical signal transmission cables. The first electrical signal splitter, the second electrical signal splitter and the discrete set of parallel electrical signal transmission cables are in electrical communication with one another. The first electrical signal splitter, the second electrical signal splitter and the discrete set of parallel electrical signal transmission cables are included in the enclosure. The first electrical signal splitter and the second electrical signal splitter within the enclosure are each terminated with external connector elements configured to provide electrical communication between an electrical signal transmitting device and an electrical signal receiving device.

BRIEF DESCRIPTION OF THE DRAWINGS

Exemplary embodiments of the invention will now be described in conjunction with the following drawings, in which.

DETAILED DESCRIPTION OF THE INVENTION

Figure 1:
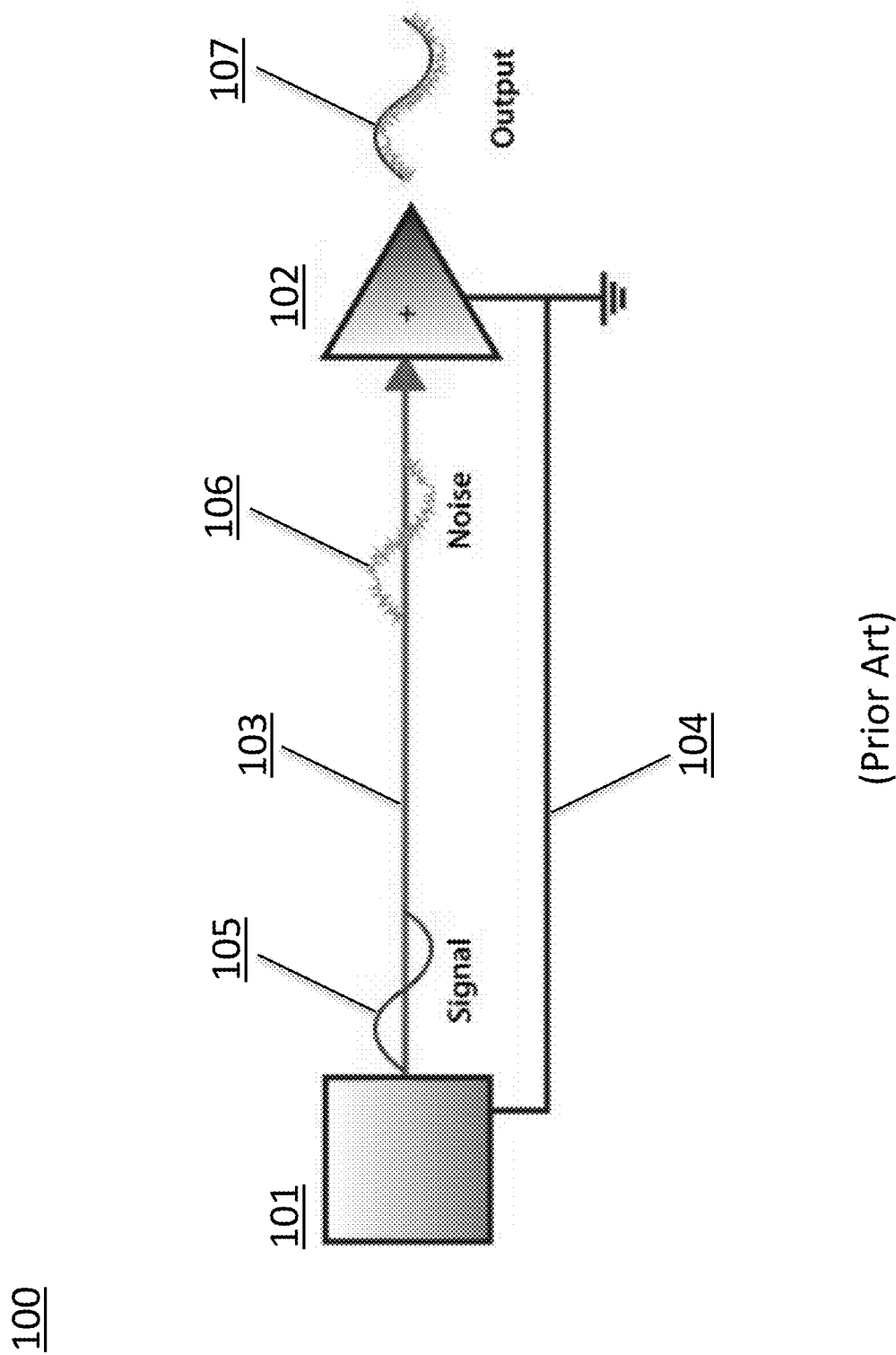
FIG. 1 depicts an exemplary schematic block representation (100) of electrical signal transmission from a electrical signal transmitting device (101) to an electrical signal transmitting receiver device (102) that are in electrical communication through a prior art embodiment of an unbalanced cable having a signal conductor (103) and a ground conductor (104), showing the signal (105) and the introduction of a signal artifact of noise (106; the fuzzy waveform) in the final electrical signal transmission waveform (107) at the input of the electrical signal transmitting receiver device (102)
Figure 2:
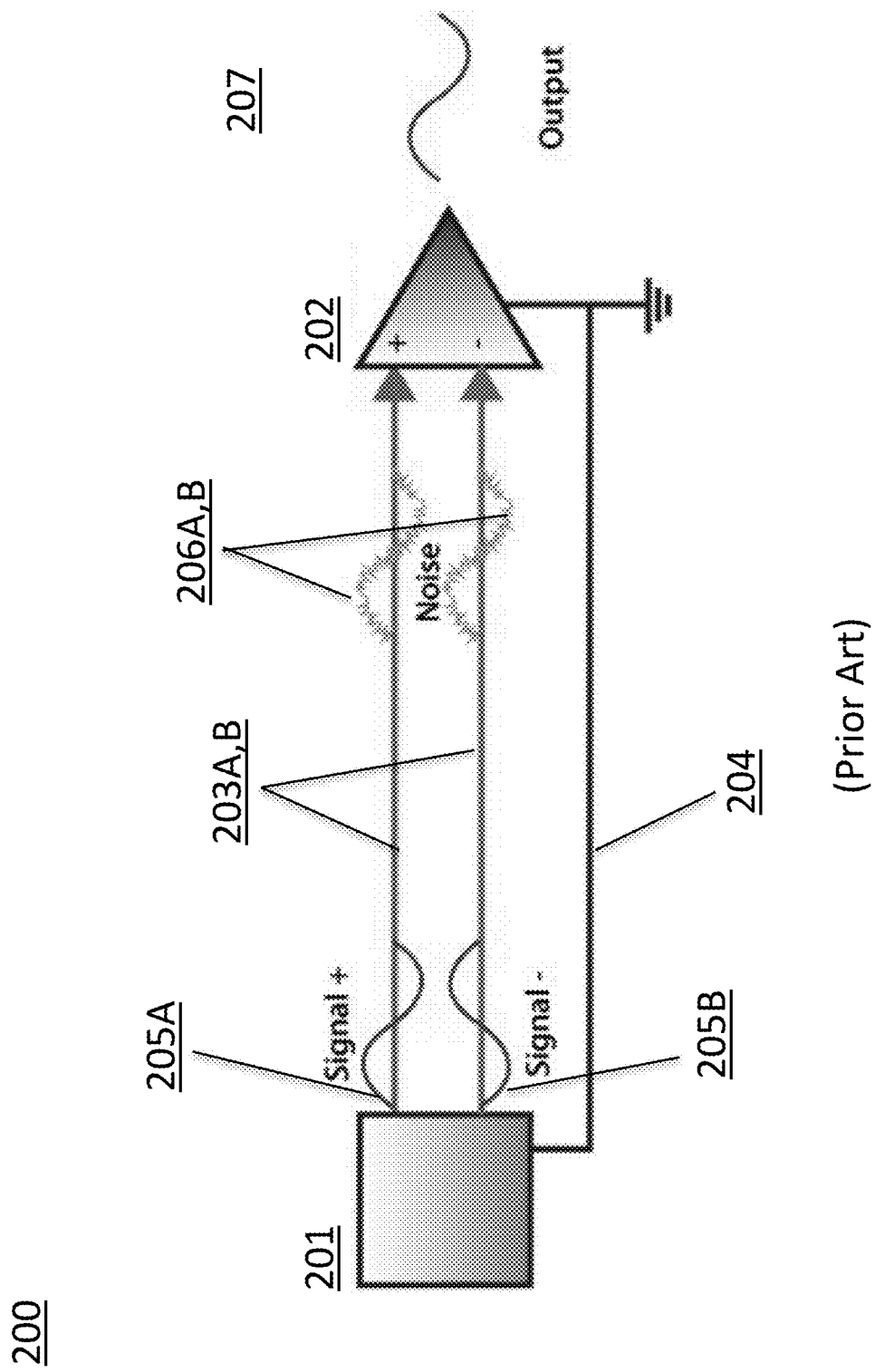
FIG. 2 depicts an exemplary schematic block representation (200) of electrical signal transmission from a electrical signal transmitting device (201) through a prior art embodiment of a balanced cable having two signal conductors (203A, B) showing the signals having opposite signal polarities (205A, B) and a ground conductor (204), and the introduction of signal artifact of noise (the fuzzy waveform) (206A, B) and its subsequent cancellation in the final electrical signal transmission waveform (207) at the input of an electrical signal transmitting receiver device (202)

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Definitions

The following definitions further explain the meaning of terms used in the disclosure and claims.

The term "artifact" refers to a type of degradation or distortion contained an electrical signal as a result of the electrical signal being transmitted through an electrical signal conductor. Exemplary artifacts include phase coherence distortion, harmonic distortion, passive intermodulation distortion, electrical noise and other interference caused by electromagnetic and radio frequency radiation unrelated to the audio signal, impedance and/or capacitance imbalances, internal signal reflections apart from the primary signal, among others, that arise for an electrical signal while being transmitted through the cable.

The term "electrical signal" refers to an energy-based signal in a particular context. Exemplary electrical signals include analog signals, digital signals and video signals.

The phrase "electrical signal transmission cable" refers to a conductive pathway or set of conductive pathways for transmitting an electrical signal there through. As used herein, an electrical signal transmission cable excludes cables used for transmitting electrical power (AC or DC).

The phrase "electrical signal transmitting device" refers to a component that delivers an electrical signal to an electrical signal transmission cable. Exemplary electrical signal transmitting devices include sources that retrieve musical information content from a tangible medium. Exemplary sources include phonograph turntables, an optical digital drive (e.g., CD players and DVD players) and storage media drives (e.g., computer hard disc, removable hard disc, USB drive, internet-based network servers, and local network-based servers and players, among others. Other exemplary electrical signal transmitting devices include signal outputs from electronic components, such a digital processors, video processors, analog processors, electronic crossovers and preamplifiers, among others. As used herein, signal outputs from amplifiers or electronic crossovers connected directly to speaker inputs are excluded from the class of electrical signal transmitting devices.

The phrase "electrical signal receiving device" refers to a component that accepts an electrical signal from an electrical signal transmission cable. Exemplary electrical signal receiving devices include signal inputs from electronic components, such a digital processors, video processors, analog processors, electronic crossovers, preamplifiers and amplifiers, among others. As used herein, signal inputs of speakers are excluded from the class of electrical signal receiving devices.

High-Definition Multimedia Interface (HDMI) audio/video interface for transmitting uncompressed video data and compressed or uncompressed digital audio data from an HDMI-compliant source device, such as a display controller, to a compatible computer monitor, video projector, digital television, or digital audio device.

A High-Definition Multimedia Interface (HDMI) signal is an electrical signal that carries uncompressed video data and compressed or uncompressed digital audio data.

As will be clear to one skilled in the art, a component can serve as both an electrical signal transmitting device and an electrical signal receiving device.

The phrase "electrical signal splitter" refers to a pathway having a plurality of n input(s) and a plurality of m output(s) for distributing or combining an electrical signal to or from an electrical signal transmission cable. An electrical signal splitter that distributes the electrical signal from a electrical signal transmitting device having n output(s) to m pathways of the electrical signal transmission cable, the value both n and m are whole integers, wherein n is less than m. An exemplary electrical signal splitter of this type includes one input (n=1) and two output pathways (m=2). An electrical signal splitter that combines the electrical signal from a electrical signal transmission cable having m pathways of a electrical signal transmission cable to n input(s) of an electrical signal receiving device, the value of both n and m are whole integers, wherein n is less than m. An exemplary electrical signal splitter of this type includes two output pathways (m=2) and one input (n=1).

An electrical signal transmission cable or plurality of electrical signal transmission cables are preferably in electrical communication with two electrical signal splitters having the same values of n and m (for example, n=1 and m=2 for both electrical signal splitters), wherein each electrical signal splitter is mechanically connected to each terminus of the electrical signal transmission cable or plurality of electrical signal transmission cables.

Electrical signal splitters can be configured in a variety of ways, and such products serving as electrical signal splitters are well known in the art and include commercial products having those structures and functions.

An "electrical connector" refers to an electrical and mechanical interface that provides electrical and mechanical communication between an electrical signal transmission cable and one of an electrical signal transmitting device or an electrical signal receiving device. Exemplary electrical connectors include RCA connectors, XLR connectors, AES/EBU XLR connectors, BNC, S/PDIF, TOSLINK and HDMI, among others.

An "electrical signal transmission cable system" includes a plurality of electrical signal splitters in electrical and mechanical communication with a plurality of parallel electrical signal transmission cables, wherein each electrical signal transmission cable includes an electrical signal conducting pathway and a ground pathway. In one preferred embodiment, the plurality of electrical signal splitters and the plurality of electrical signal transmission cables are identical such that the electrical signal is distributed equally among the parallel electrical signal transmission cables from an electrical signal splitter at one terminus of the electrical signal transmission cable system and the electoral signal is combined from the parallel electrical signal transmission cables from an electrical signal splitter at the other terminus of the electrical signal transmission cable system.

An "integrated electrical signal transmission cable system" is a single electrical signal transmission cable assembly having a plurality of electrical signal splitters in electrical and mechanical communication with a plurality of parallel electrical signal transmission cables incorporated into one discrete cable assembly terminated with electrical connectors at both ends.

Conventional electrical signal transmission cables are used in practice as single cables for interconnecting a signal transmitting device to a signal receiving device. Notwithstanding the various design topologies embodied with manufactured unbalanced or balanced electrical signal transmission cables, considerable artifacts persist in the signals transmitted through such cables, as discerned by loss in fidelity in audio reproduction for experienced listeners.

Applicants have found that use of a parallel configuration of two discrete electrical signal transmission cables for transmitting the audio signal reduces artifacts within the audio signal and thereby preserves the fidelity of the transmitted audio signal relative to that used for a prior art electrical signal transmission cable. The resulting increase in electrical signal transmission having reduced artifacts was an unexpected, surprising result that readily can be discerned, for example, as an audible improvement in the quality of sound while listening to reproduced music.

While, for the sake of simplicity, the various embodiments of the electrical signal transmission cable according to the invention will be described in relation to the transmission of analog audio signals, it will become apparent to those skilled in the art that the invention is not limited thereto, but is also beneficial in various other applications where reduction in artifacts of the transmitted electrical signal is of importance, for example, in transmission of video signals and digital signals.

Figure 3:
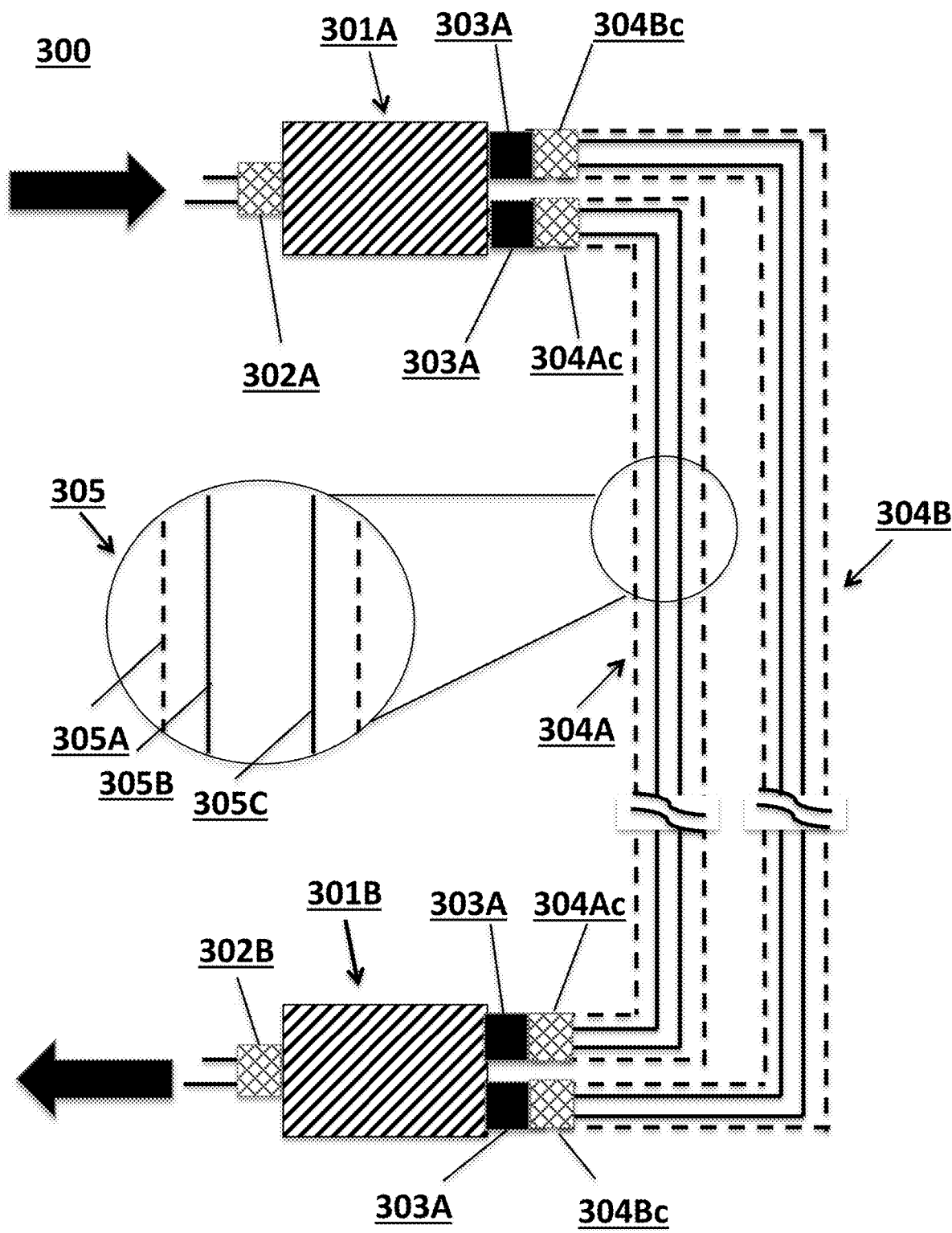
FIG. 3 depicts an exemplary schematic block representation of one preferred embodiment of a method of the present invention, wherein the arrows indicate the direction of electrical signal flow from an electrical signal transmitting device to an electrical signal receiving device via the electrical signal transmission cable system, wherein 304A and 304B are preferably the same length and topology.

Referring to FIG. 3, a simplified block diagram 300 of a method for electrical signal transmission having reduced signal artifacts is presented. The first step is establishing an electrical communication between an electrical signal transmitting device and an electrical signal receiving device, wherein the electrical communication is achieved using the following electrical signal transmission cable system. Discrete electrical signal splitters 301A and 301B are provided that are in electrical communication with electrical signal transmitting device, an electrical signal receiving device, and a parallel set of two electrical signal transmission cables 304A and 304B. Each of electrical signal splitters 301A and 301B includes connector elements 302A and 302B, respectively, to provide electrical communication with one of an electrical signal transmitting device or an electrical signal receiving device. Each of electrical signal splitters 301A and 301B also includes connector elements 303A and 303B, respectively, to provide electrical communication with each of electrical signal transmission cables 304A and 304B.

Preferably, each of electrical signal transmission cables 304A and 304B used in 300 are composed of the same cable design topology, materials, operational design and length. Each of the electrical signal transmission cables 304A and 304B are terminated at their ends with connector elements 304Ac and 304Bc, respectively. The connector elements 304Ac and 304Bc are configured to establish electrical and mechanical communication with connector elements 303A and 303B present in electrical signal splitters 301A and 301B, respectively. Referring to FIG. 3, both electrical signal transmission cables 304A and 304B are unbalanced cables. Numerous possibilities exist to provide an electrical signal transmission cable having a plurality of pathways, for example, a plurality of pathways for transmitting different electrical signals or a pathway for transmitting an electrical signal and a pathway for providing a ground connection. Referring to inset 305 of FIG. 3, electrical signal transmission cable 304A (and equivalently, 304B) is shown as including an enclosure 305A, a first pathway 305B for transmitting an electrical signal and a second pathway 305C for providing a ground connection between connector elements 303Ac. The first pathway 305B comprises a conducting medium for transmitting the electrical signal, while the second pathway 305C comprises a conducting medium. The second pathway 305C is disposed parallel to the first pathway 305B, as shown in FIG. 3, or, alternatively, wound around the first pathway 305B or alternatively configured as a sheath conductor that surrounds the first pathway 305B (not shown in FIG. 3). Both the first pathway 305B and the second pathway 305C can be surrounded individually and/or collectively with enclosure 305A that can include a mechanical dampening material, a mechanically protective material that imparts greater stability and robustness to electrical signal transmission cables 304A or 304B, a shielding material that provides shielding from external environmental radiation or noise, or a combination of such materials.

The second step is transmitting an electrical signal through the electrical signal transmission system (depicted by the directional arrows leading to and from connector elements 302A and 302B, respectively), for example, composed of a pair of discrete electrical signal splitters 301A and 301B and a parallel set of electrical signal transmission cables 304A and 304B, as arranged in FIG. 3.

Figure 4:
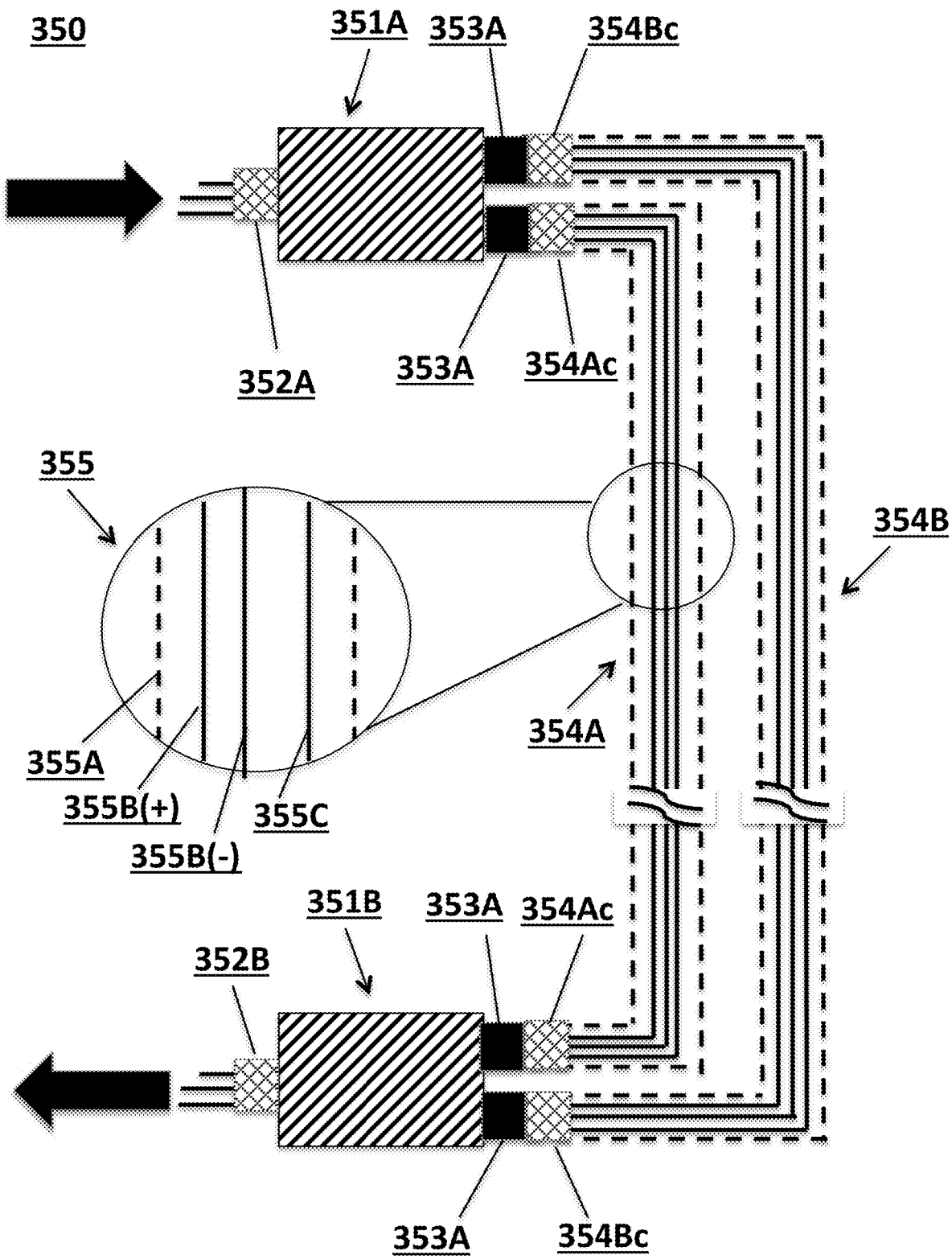
FIG. 4 depicts an exemplary schematic block representation of one preferred embodiment of a method of the present invention, wherein the arrows indicate the direction of electrical signal flow from an electrical signal transmitting device to an electrical signal receiving device via the electrical signal transmission cable system, wherein 354A and 354B are preferably the same length and topology.

Referring to FIG. 4, the method outlined in FIG. 3 can be configured to accommodate a pair of parallel, balanced electrical signal transmission cables for an electrical signal transmission cable system. For such applications, electrical signal splitters 351A and 351B include appropriate connector elements 352A and 352B configured to provide electrical and mechanical communication with connector elements 354Ac and 354Bc that terminate the balanced, electrical signal transmission cables 354A and 354B, respectively. Care should be taken to ensure that pin-out configuration of the connector elements 352A and 352B correspond to the appropriate conductor configurations of the selected set of balanced electrical signal transmission cables. One common pin-out configuration convention for such connector elements 352A and 352B have pin 1 being chassis ground (cable shield); pin 2 being positive polarity terminal for balanced audio circuits (also known as "hot" conductor); and pin 3 being negative polarity terminal for balanced audio circuits (also known as "cold" conductor). Other configurations are known in the art, as would be understood by the skill artisan. Likewise, the connector elements 352A and 353A, as well as connector elements 352B and 353B, should have the correct pin-out configurations. Similarly, connector element 354Ac and 354Bc also should have the appropriate pin-out configurations to properly mate with connector elements 353A and 353B.

Referring to FIG. 4, for the set of balanced electrical signal transmission cables connected in parallel in the electrical signal transmission cable system, numerous possibilities can provide an electrical signal transmission cable system comprising a plurality of pathways. For example, a plurality of pathways for transmitting different electrical signals or a pathway for transmitting an electrical signal and a pathway for providing a ground connection are provided. Referring to inset 355 of FIG. 4, electrical signal transmission cable 354A (and equivalently, 354B) are shown, respectively, including an enclosure 355A, a first and second pathways 355B(+) and 355B(−) for transmitting an electrical signal having opposite polarities, and a third pathway 305C for providing a ground connection between connector elements 353A and 353B. The first and second pathways 355B(+) and 355B(−) comprise a conducting medium for transmitting the electrical signal having opposite polarities, while the third pathway 305C comprises a conducting medium. The third pathway 305C is disposed parallel to first and second pathways 355B(+) and 355B(−), as shown in FIG. 4, or alternatively, wound around the first and second pathways 355B(+) and 355B(−), or alternatively configured as a sheath conductor that surrounds the first and second pathways 355B(+) and 355B(−) (not shown in FIG. 4). The first and second pathways 355B(+) and 355B(−) and third pathway 355C are surrounded individually and/or collectively with enclosure(s) 355A that can include a mechanical dampening material, a mechanically protective material that imparts greater stability and robustness to cables 354A or 354B, a shielding material that provides shielding from external environmental radiation or noise, or a combination of such materials.

The conducting medium of first pathway 305A and second pathway 305B of FIG. 3 can be composed of a variety of materials, such as solid wire or a liquid metal eutectic alloy material having conductive properties. In the latter case, first pathway 305A at least includes a tube for containing the eutectic alloy conductive material. Second pathway 305B would preferably include a tube for containing the eutectic alloy conductive material where the second pathway 305B includes an eutectic alloy conductive material. The conducting medium of alternative embodiments, such as use of a pair of balanced, electrical signal transmission cables of FIG. 4 (that is, first and second pathways 355B(+) and 355B(−) and third pathway 355C) is composed of similar materials. Examples of an electrical signal transmission cable having an eutectic alloy conductive material is disclosed in U.S. Pat. No. 8,362,358 to Ken Hotte and Taras Kowalcyzszyn, which issued Jan. 29, 2013, the contents of which are incorporated by reference in its entirety.

The embodiments presented in FIGS. 3 and 4 require two discrete electrical signal splitters 301A and 301B (as in FIG. 3) or electrical signal splitters 351A and 351B (as in FIG. 4) and two discrete sets of discrete electrical signal transmission cables 304A and 304B (as in FIG. 3) or two discrete sets of discrete electrical signal transmission cables 354A and 354B (as in FIG. 4) are required to achieve the method. The connector elements are made of an electrically conductive material, for example, a solid metal, suitable for transmitting the electrical signals. While the electrical signal transmission cable systems 300 and 400 of FIGS. 3 and 4 afford the user with great flexibility in terms of using different sets of discrete electrical signal transmission cables configured in parallel, it is desirable to have an integrated electrical signal transmission cable system having few connector elements and simpler design for the same purpose.

Figure 5:
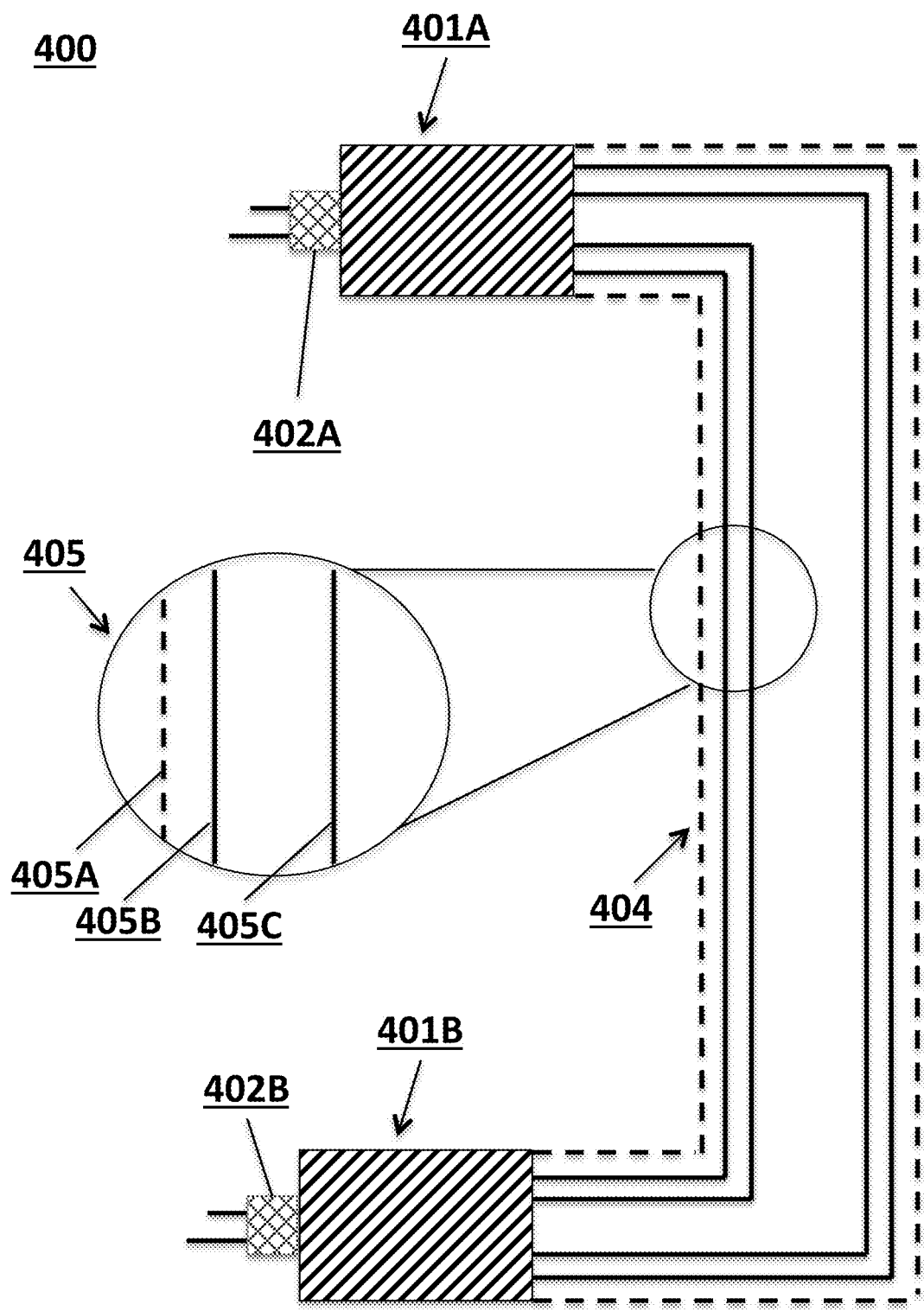
FIG. 5 depicts an exemplary schematic block representation of one preferred embodiment of a product the present invention, wherein the internal signal transmission cable conductor pathways are preferably the same length and topology.

Referring to FIG. 5, simplified block diagram of an integrated electrical signal transmission cable system 400 is presented. In this embodiment, all of the components and elements presented in FIG. 3 are presented in a single electrical signal transmission cable assembly (that is, corresponding to electrical signal splitters 301A and 301B and a set of parallel conductor pathway systems equivalent to the discrete electrical signal transmission cables 304A and 304B). Electrical signal splitters 401A and 401B are provided that are in electrical communication with a parallel set of conductor pathways within electrical signal transmission cable 404. Each of electrical signal splitters 401A and 401B is in electrical communication with one of an electrical signal transmitting device or an electrical signal receiving device via connector elements 402A and 402B, respectively. Each of electrical signal splitters 401A and 401B is in direct electrical communication with an electrical signal transmission cable 404 without requiring additional connector elements.

Preferably, electrical signal transmission cable 404 used in 400 is composed of a set of conductor pathway systems corresponding to the equivalent of two parallel electrical signal transmission cables, wherein the conductor pathways have the same cable design topology, materials, operational design and length. For example, as reflected by example in FIG. 5, the electrical signal transmission cable 404 includes a set unbalanced conductor pathways configured in parallel. Numerous possibilities exist to provide an electrical signal transmission cable comprising a plurality of pathways, for example, a plurality of pathways for transmitting different electrical signals or a pathway for transmitting an electrical signal and a pathway for providing a ground connection. Referring to inset 405 of FIG. 5, each parallel set of conductors in electrical signal transmission cable 404 are shown, respectively, as including an enclosure 405A, a first pathway 405B for transmitting an electrical signal and a second pathway 405C for providing a ground connection between connector elements 402A of both electrical signal splitters 401A and 401B. The first pathway 405B comprises a conducting medium for transmitting the electrical signal, while the second pathway 405C comprises a conducting medium. The second pathway 405C is disposed parallel to the first pathway 405B, as shown in FIG. 5, or wound around the first pathway 405B, or alternatively configured as a sheath conductor that surrounds the first pathway 405B (both not shown in FIG. 5). The first pathway 405B and the second pathway 405C are surrounded individually and/or collectively with enclosure 405A that can include a mechanical dampening material, a mechanically protective material that imparts greater stability and robustness to cable 404, a shielding material that provides shielding from external environmental radiation or noise, or a combination of such materials. The other one-half of parallel conductor pathways in electrical signal transmission cable 404 is of a similar configuration as described for inset 405 above.

Referring to FIG. 5, one preferred embodiment of the integrated electrical signal transmission cable system is presented with a parallel set of unbalanced cables internal to the cable assembly. The integrated electrical signal transmission cable system 400, however, can be configured with conductor pathways as an unbalanced topology or a balanced topology, as understood to those skilled in the art. Similarly, the integrated electrical signal transmission cable system 400 of FIG. 5 can be composed of similar materials as disclosed for the discrete cable arrangement presented in FIG. 3. Optionally, each one-half of the conductor pathway system of electrical signal transmission cable 400 can include additional enclosures 405A surrounding each set of first and second pathways 405B and 405C (not shown in FIG. 5). Such additional enclosures can include materials of natural fibers, such a cotton, linen, silk, wool, and the like, or of synthetic fibers, such as organic polymer materials (rayon, nylon, acrylic, and the like).

Figure 6:
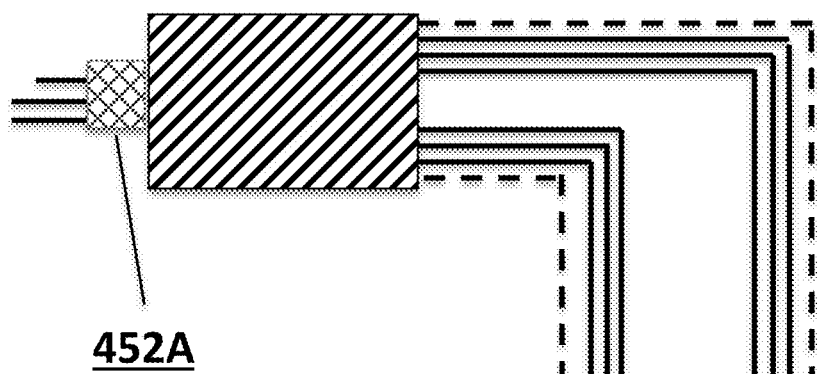
FIG. 6 depicts an exemplary schematic block representation of one preferred embodiment of a product of the present invention wherein the internal signal transmission cable conductor pathways are preferably the same length and topology.

Referring to FIG. 6, an integrated electrical signal transmission cable system 450 can be configured with a parallel set of unbalanced cables internal to the cable assembly. In this embodiment, all of the components and elements presented in FIG. 4 are presented in a single electrical signal transmission cable assembly (that is, corresponding to electrical signal splitters 341A and 351B and two sets of parallel conductor pathway systems equivalent to the discrete electrical signal transmission cables 354A and 354B). Electrical signal splitters 451A and 451B are provided that are in electrical communication with the two sets of parallel conductor pathway systems contained in 454. Each of electrical signal splitters 451A and 451B is in electrical communication with one of an electrical signal transmitting device or an electrical signal receiving device via connector elements 452A and 452B, respectively. Each of electrical signal splitters 451A and 451B is in direct electrical communication with an electrical signal transmission cable 454 without requiring additional connector elements.

Preferably, electrical signal transmission cable 454 used in 450 is composed of a set of conductor pathway systems corresponding to the equivalent of two parallel electrical signal transmission cables, wherein the conductor pathways have the same cable design topology, materials, operational design and length. For example, as reflected by example in FIG. 6, the electrical signal transmission cable 454 includes a set of conductor pathway systems corresponding to the equivalent of a pair of balanced cables configured in parallel. Numerous possibilities exist to provide an electrical signal transmission cable comprising a plurality of pathways, for example, a plurality of pathways for transmitting different electrical signals or a pathway for transmitting an electrical signal and a pathway for providing a ground connection. Referring to inset 455 of FIG. 6, each parallel set of conductor pathway systems of electrical signal transmission cable 454 are shown, respectively, as including an enclosure 455A, a first and second pathways 455B(+) and 455B(−) for transmitting electrical signals having opposite polarities, and a third pathway 455C for providing a ground connection between connector elements 452A and 452B of both electrical signal splitters 451A and 451B, respectively. The first and second pathways 455B(+) and 455B(−) comprises a conducting medium for transmitting the electrical signal, while third pathway 455C comprises a conducting medium. The third pathway 455C is disposed parallel to first and second pathways 455B(+) and 455B(−), as shown in FIG. 6, or wound around first and second pathways 455B(+) and 455B(−), or alternatively configured as a sheath conductor that surrounds first and second pathways 455B(+) and 455B(−) (both not shown in FIG. 6). Both first and second pathways 455B(+) and 455B(−) and the third pathway 455C are surrounded individually and/or collectively with enclosure 455A that can include a mechanical dampening material, a mechanically protective material that imparts greater stability and robustness to cable 454, a shielding material that provides shielding from external environmental radiation or noise, or a combination of such materials. The other one-half of the conductor pathway system of electrical signal transmission cable 454 is of a similar configuration as described for inset 405 above. Optionally, each one-half of electrical signal transmission cable 454 can include additional enclosures 455A surrounding each set of first and second pathways 455B(+) and 455B(−) and the third pathway 455C (not shown in FIG. 6). Such additional enclosures can include materials of natural fibers, such a cotton, linen, silk, wool, and the like, or of synthetic fibers, such as organic polymer materials (rayon, nylon, acrylic, and the like).

Figure 7:
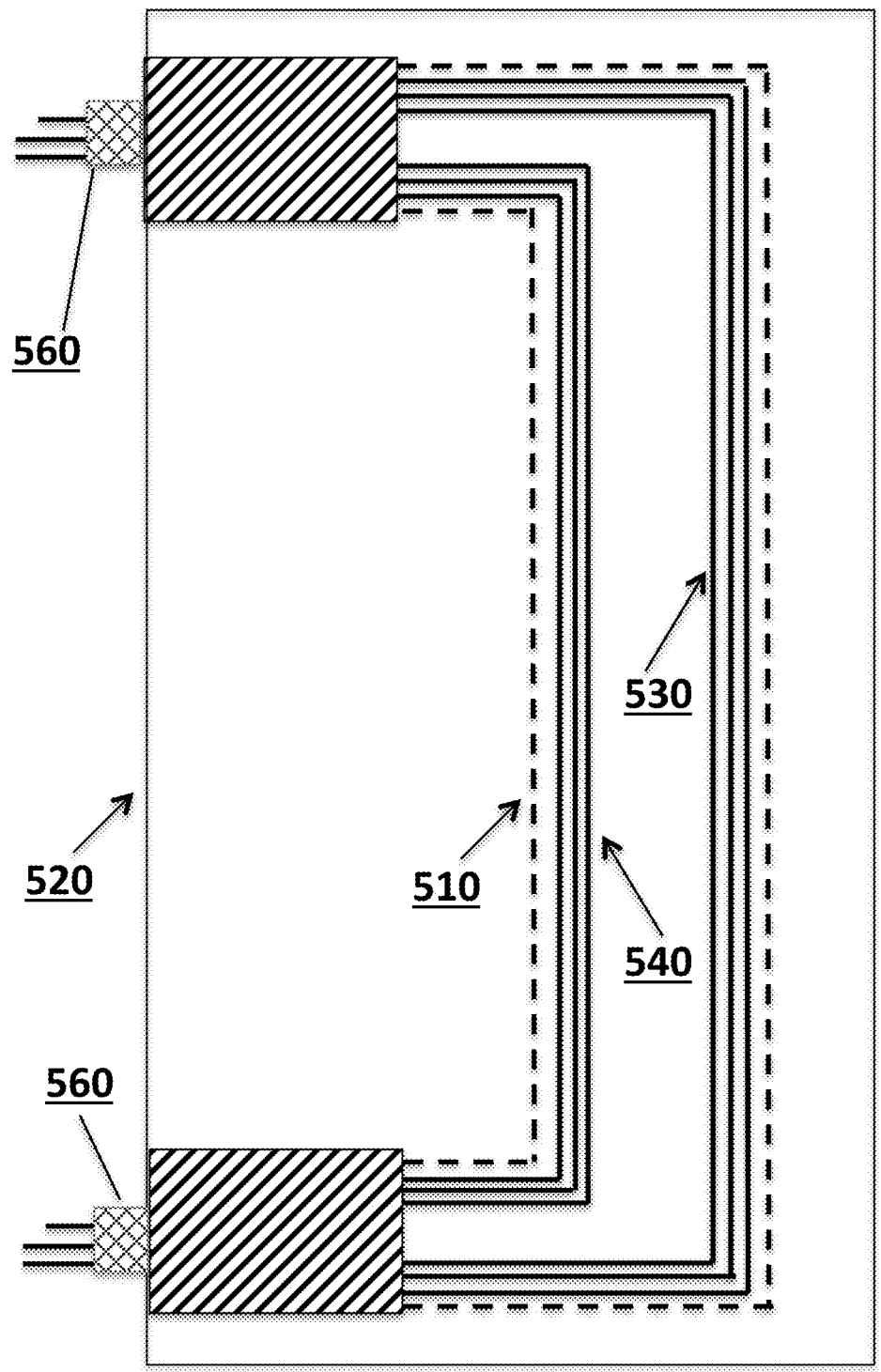
FIG. 7 depicts an exemplary schematic block representation of one preferred embodiment of a product of the present invention wherein a parallel assembly is contained within an enclosure.

Referring to FIG. 7, enclosed assembly 500 includes electrical signal transmission cable 510 and enclosure 520. The electrical signal transmission cable 510 can be an integrated parallel conductor assembly having two parallel conductors 530 and 540 in electrical communication with like conductors (signal conductors, return conductors or ground conductors) in enclosure 520, wherein a single external connector 560 emerges from each end of enclosure 520 (FIG. 7). The types and plurality of conductors and connectors of enclosed assemblies 500 are similar to those described previously herein. Alternatively, two parallel conductors 530 and 540 can be separate and presented in electrical communication with optionally terminated with external Y-splitters in enclosed assembly 500.

Figure 8:
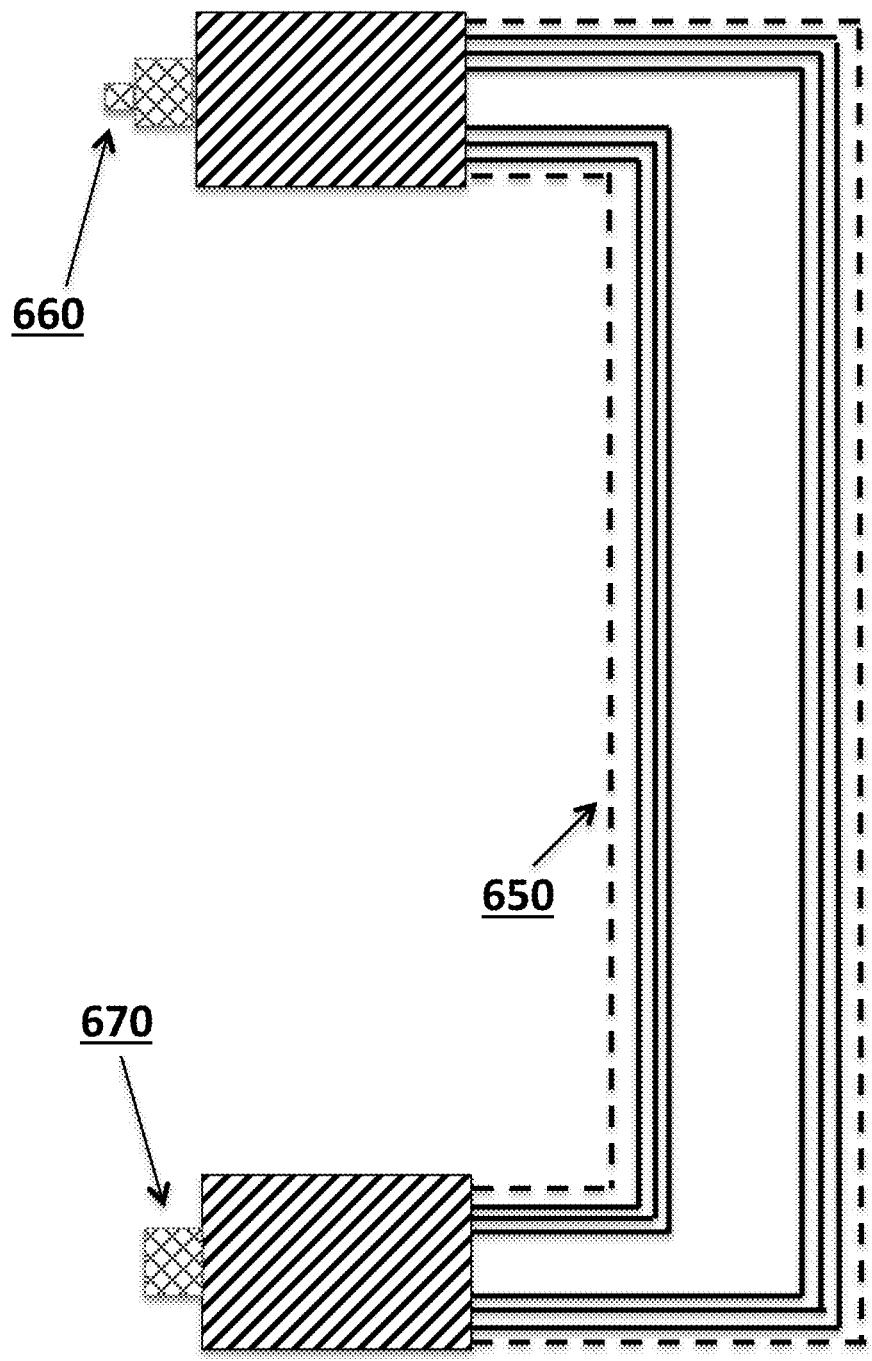
FIG. 8 depicts an exemplary schematic block representation of one preferred embodiment of a product of the present invention wherein a parallel assembly is terminated with two asymmetric connectors.

Referring to FIG. 8, electrical signal transmission cable 600 includes integrated parallel conductor assembly 650 and two asymmetric connectors 660 and 670 in which one connector is at each terminus of electrical signal transmission cable 600. The integrated parallel conductor assembly includes the same arrangement of parallel conductors as described herein. The two asymmetric connectors 660 and 670 for an unbalanced integrated parallel conductor assembly include typically one male RCA connector (e.g., 660) and one female RCA connector (e.g., 670), as exemplified in FIG. 8. The two asymmetric connectors 660 and 670 for an balanced integrated parallel conductor assembly includes typically one male XLR connector and one female XLR connector. The types and plurality of conductors and connectors of electrical signal transmission cable 600 are similar to those described previously herein. Preferred lengths of electrical signal transmission cable 600 range from 0.50 feet to 3 feet. Longer lengths are possible as well for electrical signal transmission cable 600.

In other preferred embodiments of electrical signal transmission cable 600, the connectors 660 and 670 at each terminus of electrical signal transmission cable 600 can include symmetric connectors 660 and 670. The integrated parallel conductor assembly includes the same arrangement of parallel conductors as described herein. The two symmetric connectors 660 and 670 for an unbalanced integrated parallel conductor assembly include typically either two male RCA connectors or alternatively two female RCA connectors. The two symmetric connectors 660 and 670 for a balanced integrated parallel conductor assembly includes typically two male XLR connectors or alternatively and two female XLR connectors. Other external connectors may be used as appropriate for the particular electrical signal transmission cable 600, as described herein.

Conductor Dressing

The conductors disclosed in the various embodiments of the present invention can be arranged in a variety of ways with respect to each other. Typical conductor arrangements include twisting like conductors together separately from unlike conductors or twisting like and unlike conductors together. One skilled in the art would recognize the permutations of conductor dressings in which conductors are twisted or intertwined together. Such arrangements include clockwise twists, counterclockwise twists and combinations of clockwise twists and counterclockwise twists.

Applications

In a first aspect, a method of reducing an artifact in an electrical signal transmission through an electrical signal transmission cable is provided. The method includes several steps. A first step includes providing an electrical signal transmitting device. A second step includes providing an electrical signal receiving device. A third step includes providing an electrical signal transmission cable system, wherein the electrical signal transmission cable system comprises a parallel set of electrical signal transmission cables in electrical communication between the electrical signal transmitting device and the electrical signal receiving device. A fourth step includes transmitting an electrical signal through the electrical signal transmission cable system from the electrical signal transmitting device to the electrical signal receiving device. As a result of using the method, an artifact is reduced in the electrical signal transmission delivered to the electrical signal receiving device.

In a first respect of the method, the electrical signal transmitting device comprises a terminal connecting element selected from the group consisting of a balanced XLR audio output, a digital RCA output, a digital BNC output, an unbalanced RCA audio output, a digital AES/EBU output and a High-Definition Multimedia Interface (HDMI) output and wherein the electrical signal receiving device comprises a terminal connecting element selected from the group consisting of a balanced XLR audio input, a digital RCA input, a digital BNC input, an unbalanced RCA audio input, a digital AES/EBU input and a High-Definition Multimedia Interface (HDMI) input.

In a second respect of the method, the parallel set of electrical signal transmission cables in electrical communication between the electrical signal transmitting device and the electrical signal receiving device comprises a product comprising an integrated electrical signal transmission cable system. The product includes an enclosure; a first electrical signal splitter; a second electrical signal splitter; and a discrete set of parallel electrical signal transmission cables. The first electrical signal splitter, the second electrical signal splitter and the discrete set of parallel electrical signal transmission cables are in electrical communication with one another. The first electrical signal splitter, the second electrical signal splitter and the discrete set of parallel electrical signal transmission cables are included in the enclosure. The first electrical signal splitter, the second electrical signal splitter within the enclosure are each terminated with external connector elements configured to provide electrical communication between an electrical signal transmitting device and an electrical signal receiving device. In this respect of the method, the discrete set of parallel electrical signal transmission cables comprise two or more signal conductors connected in parallel electrical communication and two or more ground conductors connected in parallel electrical communication. In this respect of the method, the discrete set of parallel electrical signal transmission cables comprise external connector elements at each terminus selected from the group consisting of balanced XLR audio connectors, unbalanced RCA audio connectors, digital RCA connectors, digital BNC connectors, digital AES/EBU connectors and High-Definition Multimedia Interface (HDMI) connectors. In this respect, the discrete set of parallel electrical signal transmission cables comprise signal conductors having an individual impedance selected from 75 ohms or 110 ohms. In a wherein the electrical signal is selected from the group consisting of an unbalanced audio signal, a balanced audio signal, an unbalanced digital signal, a balanced digital signal and a High-Definition Multimedia Interface (HDMI) signal.

In a third respect of the method, the electrical signal transmitting device comprises a member selected from the group consisting of an analog turntable, a compact disk player, a Digital Versatile Disc (DVD) player, a Blu-ray player, a analog tape player, a digital tape player, a digital music server, a computer, a Digital to Analog Converter (DAC) an Analog to Digital Converter (ADC), a signal processor, a phono stage preamplifier and a preamplifier.

In a fourth respect of the method, the electrical signal receiving device comprises a member selected from a signal processor, a monitor, a preamplifier and an amplifier.

In a second aspect, a product comprising an integrated electrical signal transmission cable system. The product includes an enclosure; a first electrical signal splitter; a second electrical signal splitter; and a discrete set of parallel electrical signal transmission cables. The first electrical signal splitter, the second electrical signal splitter and the discrete set of parallel electrical signal transmission cables are in electrical communication with one another. The first electrical signal splitter, the second electrical signal splitter and the discrete set of parallel electrical signal transmission cables are included in the enclosure. The first electrical signal splitter and the second electrical signal splitter within the enclosure are each terminated with external connector elements configured to provide electrical communication between an electrical signal transmitting device and an electrical signal receiving device.

In a first respect of the product, the discrete set of parallel electrical signal transmission cables comprise two or more signal conductors connected in parallel electrical communication and two or more ground conductors connected in parallel electrical communication.

In a second respect of the product, the discrete set of parallel electrical signal transmission cables comprises external connector elements at each terminus selected from the group consisting of balanced XLR audio connectors, unbalanced RCA audio connectors, digital RCA connectors, digital BNC connectors, digital AES/EBU connectors and High-Definition Multimedia Interface (HDMI) connectors.

In this respect, the external connector element at each terminus comprises asymmetrical, electrically compatible, external connectors.

In this respect, the external connector element at each terminus comprises symmetrical, electrically compatible, external connectors.

In a third respect of the product, the discrete set of parallel electrical signal transmission cables comprise signal conductors having an individual impedance selected from 75 ohms or 110 ohms.

In a fourth respect of the product, the discrete set of parallel electrical signal transmission cables comprises signal conductors selected from the group consisting of an unbalanced audio signal conductor, a balanced audio signal conductor, an unbalanced digital signal conductor, a balanced digital signal conductor and a High-Definition Multimedia Interface (HDMI) signal conductor.

In a fifth respect of the product, the enclosure comprises one selected from the group consisting of a cloth tubular element, a synthetic polymer tubular element and a solid container.

Numerous other embodiments of the invention will be apparent to persons skilled in the art without departing from the scope of the invention as defined in the appended claims.

What is claimed is:

1. A method of reducing an artifact in an electrical signal transmission through an electrical signal transmission cable, comprising:
   (a) providing an electrical signal transmitting device;
   (b) providing an electrical signal receiving device;
   (c) providing an electrical signal transmission cable system, wherein the electrical signal transmission cable system comprises a parallel set of electrical signal transmission cables in electrical communication between the electrical signal transmitting device and the electrical signal receiving device;
   (d) transmitting an electrical signal through the electrical signal transmission cable system from the electrical signal transmitting device to the electrical signal receiving device,
   wherein the artifact is reduced in the electrical signal transmission delivered to the electrical signal receiving device,
   wherein the electrical signal is an analog audio signal.

2. The method of claim 1, wherein the electrical signal transmitting device comprises a terminal connecting element selected from the group consisting of a balanced XLR audio output, and an unbalanced RCA audio output, wherein the electrical signal receiving device comprises a terminal connecting element selected from the group consisting of a balanced XLR audio input, and an unbalanced RCA audio input.

3. The method of claim 1, wherein the parallel set of electrical signal transmission cables in electrical communication between the electrical signal transmitting device and the electrical signal receiving device comprises a product comprising an integrated electrical signal transmission cable system, said product comprising:
   (a) an enclosure;
   (b) a first electrical signal splitter;
   (c) a second electrical signal splitter; and
   (d) a discrete set of parallel electrical signal transmission cables,
   wherein the first electrical signal splitter, the second electrical signal splitter and the discrete set of parallel electrical signal transmission cables are in electrical communication with one another;
   wherein the first electrical signal splitter, the second electrical signal splitter and the discrete set of parallel electrical signal transmission cables are included in the enclosure,
   wherein first electrical signal splitter, the second electrical signal splitter within the enclosure are each terminated with external connector elements configured to provide electrical communication between an electrical signal transmitting device and an electrical signal receiving device.

4. The method of claim 3, wherein the discrete set of parallel electrical signal transmission cables comprise two or more signal conductors connected in parallel electrical communication and two or more ground conductors connected in parallel electrical communication.

5. The method of claim 4, wherein the discrete set of parallel electrical signal transmission cables comprises external connector elements at each terminus selected from the group consisting of balanced XLR audio connectors and unbalanced RCA audio connectors.

6. The method of claim 4, wherein the discrete set of parallel electrical signal transmission cables comprise signal conductors having an individual impedance selected from 75 ohms or 110 ohms.

7. The method of claim 1, wherein the electrical signal is selected from the group consisting of an unbalanced audio signal and a balanced audio signal.

8. The method of claim 1, wherein the electrical signal transmitting device comprises a member selected from the group consisting of an analog turntable, a compact disk player, a Digital Versatile Disc (DVD) player, a Blu-ray player, a analog tape player, a digital tape player, a digital music server, a computer, a Digital to Analog Converter (DAC), an analog signal processor, a phono stage preamplifier, and a preamplifier.

9. The method of claim 1, wherein the electrical signal receiving device comprises a member selected from an analog signal processor, a monitor, a preamplifier and an amplifier.

10. A product comprising an integrated electrical signal transmission cable system for reducing an artifact in an electrical signal transmitted through the integrated electrical signal transmission cable system, said product comprises:
(a) an enclosure;
(b) a first electrical signal splitter;
(c) a second electrical signal splitter; and
(d) a discrete set of parallel electrical signal transmission cables,
wherein the first electrical signal splitter, the second electrical signal splitter and the discrete set of parallel electrical signal transmission cables are in electrical communication with one another;
wherein the first electrical signal splitter, the second electrical signal splitter and the discrete set of parallel electrical signal transmission cables are included in the enclosure,
wherein first electrical signal splitter and the second electrical signal splitter within the enclosure are each terminated with external connector elements configured to provide electrical communication between an electrical signal transmitting device and an electrical signal receiving device,
wherein the artifact is reduced in the electrical signal transmission delivered to the electrical signal receiving device,
wherein the electrical signal is an analog audio signal.

11. The product of claim 10, wherein the discrete set of parallel electrical signal transmission cables comprise two or more signal conductors connected in parallel electrical communication and two or more ground conductors connected in parallel electrical communication.

12. The product of claim 10, wherein the discrete set of parallel electrical signal transmission cables comprises external connector elements at each terminus selected from the group consisting of balanced XLR audio connectors and unbalanced RCA audio connectors.

13. The product of claim 12, wherein the external connector elements at each terminus comprises asymmetrical, electrically compatible, external connectors.

14. The product of claim 12, wherein the external connector elements at each terminus comprises symmetrical, electrically compatible, external connectors.

15. The product of claim 10, wherein the discrete set of parallel electrical signal transmission cables comprise signal conductors having an individual impedance selected from 75 ohms or 110 ohms.

16. The product of claim 10, wherein the discrete set of parallel electrical signal transmission cables comprises signal conductors selected from the group consisting of an unbalanced audio signal conductor and a balanced audio signal conductor.

17. The product of claim 10, wherein the enclosure comprises one selected from the group consisting of a cloth tubular element, a synthetic polymer tubular element and a solid container.

18. A product comprising an electrical signal transmission cable system for reducing an artifact in an electrical signal transmitted through the electrical signal transmission cable system, said product comprising:
(a) a first external electrical signal splitter configured with external connector elements in a single enclosure;
(b) a second external electrical signal splitter configured with external connector elements in a single enclosure; and
(c) a set of at least two discrete electrical signal transmission cables, wherein each member of the set comprises:
an enclosure;
at least one signal conductor;
a ground conductor;
a first external connector element; and
a second external connector element;
wherein each member of the set of at least two discrete electrical signal transmission cables is configured to transmit an electrical signal between an electrical signal transmitting device and an electrical signal receiving device when used in isolation;
wherein the first external electrical signal splitter, the second external electrical signal splitter and the set of at least two discrete electrical signal transmission cables are configured in electrical communication with one another via electrically compatible, connector elements such that the set of at least two discrete electrical signal transmission cables are configured in parallel and disposed in electrical communication between the first external electrical signal splitter and the second external electrical signal splitter,
wherein first external electrical signal splitter and the second external electrical signal splitter are configured to provide electrical communication between an electrical signal transmitting device and an electrical signal receiving device,
wherein the artifact is reduced in the electrical signal transmission delivered to the electrical signal receiving device,
wherein the electrical signal is an analog audio signal.

19. The product of claim 18, wherein the at least one signal conductor of each member of the set of at least two discrete electrical signal transmission cables is selected from the group consisting of an unbalanced audio signal conductor and a balanced audio signal conductor.

20. The product of claim 18, wherein the first and second external connector elements of each member of the set of at least two discrete electrical signal transmission cables are selected from the group consisting of unbalanced audio connector elements and balanced audio connector elements, said first and second external connector elements being electrically and physically compatible with the external connector elements of the first electrical signal splitter and second electrical signal splitter to provide electrical communication between an electrical signal transmitting device and an electrical signal receiving device when the electrical signal transmission cable system is electrically and physically connected to the electrical signal transmitting device and the electrical signal receiving device.

* * * * *